(12) United States Patent
Lee et al.

(10) Patent No.: US 7,552,041 B2
(45) Date of Patent: Jun. 23, 2009

(54) METHOD, SYSTEM, AND COMPUTER PROGRAM PRODUCT FOR DETERMINING AN OPTIMAL DATABASE REFRESH RATE

(75) Inventors: Young M. Lee, Old Westbury, NY (US); Edward W. Armstrong, Chapel Hill, NC (US); Kenneth M. Cyprys, Chappaqua, NY (US); Joseph P. DeMarco, Newburgh, NY (US)

(73) Assignee: International Business Machines Corporation, Armonk, NY (US)

( * ) Notice: Subject to any disclaimer, the term of this patent is extended or adjusted under 35 U.S.C. 154(b) by 205 days.

(21) Appl. No.: 11/163,039

(22) Filed: Oct. 3, 2005

(65) Prior Publication Data

US 2007/0088626 A1    Apr. 19, 2007

(51) Int. Cl.
*G06F 17/50* (2006.01)
(52) U.S. Cl. .......................................... 703/13; 705/27
(58) Field of Classification Search ................... 703/13; 705/27
See application file for complete search history.

(56) References Cited

U.S. PATENT DOCUMENTS

| | | | |
|---|---|---|---|
| 5,946,662 A | 8/1999 | Ettl et al. | |
| 6,167,380 A | 12/2000 | Kennedy et al. | |
| 6,188,989 B1 | 2/2001 | Kennedy | |
| 6,463,345 B1 | 10/2002 | Peachey-Kountz et al. | |
| 6,606,744 B1 * | 8/2003 | Mikurak | 717/174 |
| 6,763,104 B1 * | 7/2004 | Judkins et al. | 379/265.09 |
| 7,130,812 B1 * | 10/2006 | Iyer et al. | 705/10 |
| 7,162,503 B2 * | 1/2007 | Oeda | 707/203 |
| 2002/0002448 A1 | 1/2002 | Kampe | |
| 2002/0042756 A1 | 4/2002 | Kumar et al. | |
| 2002/0077800 A1 | 6/2002 | Kampe | |
| 2003/0134628 A1 * | 7/2003 | Litwin | 455/419 |

OTHER PUBLICATIONS

Ahmet Bulut, A flexible Data Mining Architecture for Monitoring Data Streams, Jun. 2005.*

* cited by examiner

*Primary Examiner*—Paul L Rodriguez
*Assistant Examiner*—Andre Pierre Louis
(74) *Attorney, Agent, or Firm*—Cantor Colburn LLP; Todd Li (57) ABSTRACT

A method, system, and computer program product for determining an optimal database refresh rate is provided. The method includes simulating a shopping system that includes a plurality of databases, the simulating including updating the plurality of databases in accordance with a database refresh rate. The method also includes repeating the simulating for each of a number of database refresh rates and calculating error rates for availability of product determinations resulting from each of the simulations. The method further includes estimating customer satisfaction levels for the error rates and comparing the customer satisfaction levels to corresponding costs of implementing database refreshes corresponding to each of the database refresh rates.

23 Claims, 4 Drawing Sheets

METHOD, SYSTEM, AND COMPUTER PROGRAM PRODUCT FOR DETERMINING AN OPTIMAL DATABASE REFRESH RATE

BACKGROUND OF THE INVENTION

The present invention relates generally to electronic commerce activities and, more particularly, to a method, system, and computer program product for determining an optimal database refresh rate for a commerce system.

For e-commerce businesses, such as Web-based sales of computers, where customers intend to find and purchase products using a sales site of the Internet, along with price and function, availability lead time is one of the important pieces of information that is used by a customer to make a decision on whether to buy a product. While a customer is browsing various products in a catalog, it is important to have this information displayed immediately in order for the customer to have a positive experience. For this reason, the calculations used in determining availability should be done prior to the customer accessing the catalog and should be integrated with the display of product information.

Product availability is typically computed using a database of products and components availability and is presented during the shopping experience to set customer expectations. Based on the provided ship date, as well as other information such as price, features etc., customers make decisions on whether to purchase the product. When a customer places an order, a ship date is computed and is promised to the customer. In addition to setting an accurate availability expectation during learn, shop and buy experiences, shipping the product on time at checkout is an important indicator of customer service level. When products are shipped later than the promised ship date, customer service levels are degraded, causing an unfavorable business condition.

The availability of products and components are constantly changing as customer orders are fulfilled, production/assembly is scheduled, and components are replenished from suppliers. The size of this dynamic data is usually very large especially for large enterprises, and the data is also usually integrated with other corporate IT systems. It is also very expensive to update this database frequently as customers shop and purchase on the Internet, because of the supporting information technology (IT) architecture, such as size and number of servers and CPU time. Thus, it is a typical practice for corporations to take a snap shot of the availability outlook database a few times a day, and use this static view of the availability information to compute availability during the customer e-shopping activities. However, due to the inaccurate view of the availability in this static database, a certain number of customers will be given incorrect lead times, thus resulting in a degree of dissatisfaction.

What is needed, therefore, is a way to accurately estimate the error rate of availability lead time computation and corresponding IT expense for various refresh frequencies.

SUMMARY OF THE INVENTION

The foregoing discussed drawbacks and deficiencies of the prior art are overcome or alleviated by a method, system, and storage medium for determining an optimal database refresh rate.

The method includes simulating a shopping system that includes at least one simulated database, the simulating including updating the simulated database in accordance with a database refresh rate. The method also includes repeating the simulating for each of a number of database refresh rates and calculating error rates for availability of products resulting from each of the simulations. The method further includes estimating customer satisfaction levels for the error rates and comparing the customer satisfaction levels to corresponding costs of implementing database refreshes for each of the database refresh rates.

The system includes a processor, a storage device in communication with the processor, and an availability simulation engine executing on the processor. The availability simulation engine performs a method. The method includes simulating a shopping system that includes at least one simulated database. The simulating includes updating the simulated database in accordance with a database refresh rate. The method also includes repeating the simulating for each of a number of database refresh rates, calculating error rates for availability of products resulting from each of the simulations, estimating customer satisfaction levels for the error rates, and comparing the customer satisfaction levels to corresponding costs of implementing database refreshes for each of the database refresh rates.

The computer program product includes instructions for performing a method. The method includes simulating a shopping system that includes at least one simulated database. The simulating includes updating the simulated database in accordance with a database refresh rate. The method also includes repeating the simulating for each of a number of database refresh rates, calculating error rates for availability of products resulting from each of the simulations, estimating customer satisfaction levels for the error rates, and comparing the customer satisfaction levels to corresponding costs of implementing database refreshes for each of the database refresh rates.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Referring to the exemplary drawings wherein like elements are numbered alike in the several FIGURES.

DETAILED DESCRIPTION OF THE EXEMPLARY EMBODIMENTS

Disclosed herein is a method, system, and storage medium for determining an optimal database refresh rate. Refresh optimization services are provided for determining an effective database refresh frequency of availability outlook by simulating the corresponding supply chain. The simulations provide insight that enable decision makers to evaluate the refresh frequencies and provides necessary quantitative information in advance of developing and investing in costly IT. The simulation method uses various stochastic information, such as customer order arrival distribution, supply distribution, order processing time, and various supply chain policies, to simulate the generation of availability lead time error, and IT resource requirement. Using the simulation results, business decision makers may compare the customer service level, as well as the cost of future lost opportunities to corresponding IT expense for several feasible refresh frequency ranges, and make an educated decision on the database refresh frequency of supply chain availability outlook.

Figure 1:
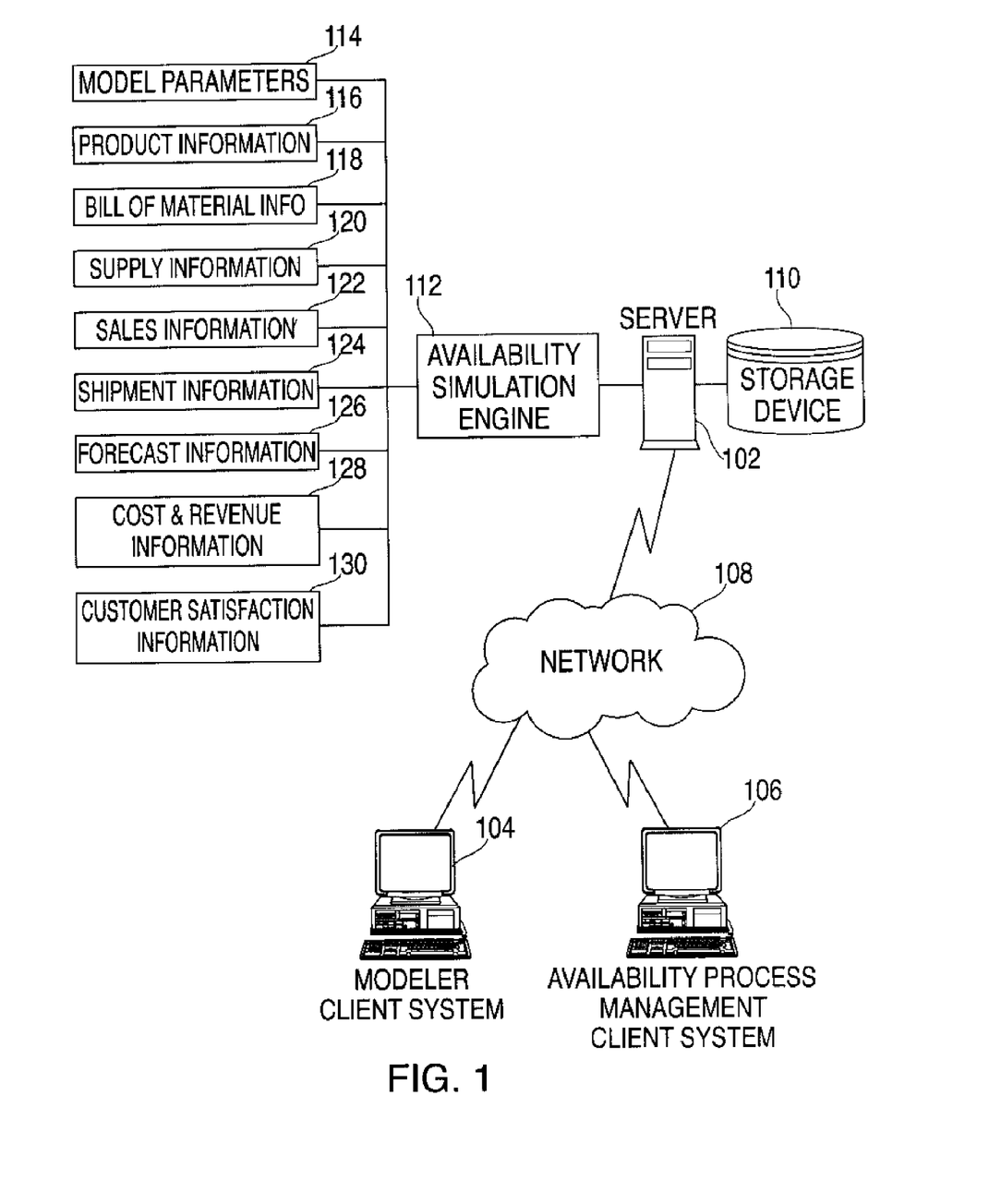
FIG. 1 is a block diagram of a system upon which the refresh optimization services may be implemented in exemplary embodiments.

Turning now to FIG. 1, a network system upon which the refresh optimization services may be implemented will now be described in accordance with exemplary embodiments. The system of FIG. 1 includes a host system or server 102 in communication with client systems 104 and 106 via a network 108. The server 102 may be implemented by an enterprise that conducts supply chain management activities and may further execute various business applications such as a commerce engine, an enterprise resource planning (ERP) engine, and scheduling engine. The commerce engine manages, for example, catalog, product configuration, and shopping cart activities. The ERP engine may be responsible for implementing order management activities, while the scheduling engine facilitates planning, scheduling, and availability functions. The commerce engine may be a web-based application that provides customer systems (not shown) with the ability to view products and services (e.g., pictures and descriptions), obtain prices, and purchase products and services on line. The ERP engine may be an automated system that manages numerous organizational functions including order management. In exemplary embodiments, orders are submitted from the commerce engine to the ERP engine for production and fulfillment processing. The ERP engine passes key order attribute information to the scheduling engine. The scheduling engine may be an automated system that receives order attribute information from the ERP engine.

For purposes of illustration, non-web components of the server 102 may utilize IBM's Lotus 1-2-3™ spreadsheets, DB2® databases, or other suitable data intense manipulation programs.

The server 102 may be implemented using one of more processors operating in response to a computer program stored in a storage medium accessible by the server. The server 102 may operate as a network server (e.g., a web server) to communicate with client systems such as customer client systems (not shown) and client systems 104 and 106. Server 102 handles sending and receiving information to and from client systems and can perform associated tasks.

Server 102 may also operate as an application server. Server 102 executes one or more computer programs to implement the refresh optimization processes and related functions. These one or more applications are referred to herein as an availability simulation engine 112. As previously described, it is understood that separate servers may be utilized to implement the network server functions and the application server functions. Alternatively, the network server, the firewall, and the application server may be implemented by a single server executing computer programs to perform the requisite functions.

Server 102 may include an IBM® eServer™ (iSeries™, pSeries™, xSeries™ or zSeries™) or any other suitable commercially available computer systems depending on the scope of the implementation. The server 102 may execute web server software designed to accommodate various forms of communications, including voice, video, and text typically utilized by large organizations. Any web server software or similar program that handles general communications protocols and transport layer activities could be used as appropriate for the network protocol in use. For purposes of illustration, server 102 is running IBM's Lotus Domino™ and Lotus Notes™ as its groupware applications software; however, any compatible e-mail-integrated, web-enabled collaborative software could be used.

As shown in the system of FIG. 1, server 102 is directly connected to a storage device 110; however, it will be understood by those skilled in the art that server 102 may in communication with storage device 110 via one or more networks (e.g., network 108). Storage device 110 may be implemented using a variety of devices for storing electronic information. It is understood that storage device 110 may be implemented using memory contained in the server 102 or it may be a separate physical device. The storage device 110 is logically addressable as a consolidated data source across a distributed environment that includes network 108. Information stored in the storage device 110 may be retrieved and manipulated via the server 102 and/or client systems 104, 106. The storage device 110 includes a data repository containing, e.g., documents, data, web pages, images, multimedia, etc. In exemplary embodiments, storage device 110 stores a catalog of products or services provided by the enterprise of FIG. 1. Storage device 110 may also store inventories of product and component availability. In an exemplary embodiment, the server 102 operates as a database server and coordinates access to application data including data stored within the storage device 110.

The storage device 110 may comprise any form of mass storage device configured to read and write database-type data maintained in a file store (e.g., a magnetic disk data storage device). The storage device 110 may range from a single hard disk drive on a personal computer to a large storage system, e.g., IBM's Shark™. Of course, it will be appreciated that the storage device 110 may be one that consists of multiple disk subsystems which may be geographically dispersed and coupled via network architecture.

There is no positive requirement that the storage device 110 be maintained in one facility; to the contrary, the volume of information stored therein may dictate geographical dispersion and the like. The storage device 110 is logically addressable as a consolidated data source across a distributed environment such as network 108. The implementation of local and wide-area database management systems to achieve the functionality of the storage device 110 will be readily understood by those skilled in the art. Information stored in the storage device 110 may be retrieved and manipulated by a database manager and data mining software, such as IBM's DB/2® software.

Network 108 may be any type of known network including, but not limited to, a Local Area Network (LAN), a Wide Area Network (WAN), a global network (e.g., Internet), a Virtual Private Network (VPN), an intranet, or other network configuration known in the art. These networks may be implemented using a wireless network or physically connected to each other in a state of the art configuration. One or both of the client systems 104 and 106 may be coupled to the server 102 through multiple networks (e.g., intranet and Internet) so that not all clients systems (e.g., 104 and 106) are coupled to server 102 through the same network. One or both of the client systems 104 and 106 and the server 102 may be connected to the network 108 in a wireless fashion. For example, one or both client systems 104 and 106 may execute a user interface application (e.g., a web browser) to contact the server 102 through the network 108, while another client system is directly connected to the server 102. Further, the network may include wireless connections, radio based communications, telephony based communications, and other network-based communications. Secure Socket Layer (SSL encryption) software may be used to control access to server 102, limiting permissions to network users, such as remote client systems or third party systems, which have proper authorization.

As indicated above, server 102 executes an availability simulation engine 112. The availability simulation engine 112 is a modeling application that provides a developer with the ability to design a simulation model that reflects the supply chain management process involved in a shopping system including specific conditions on product availability, inventory, and customer satisfaction.

The availability simulation engine 112 utilizes information from a variety of data sources. In accordance with exemplary embodiments, there are nine data sources, or components 114-130, utilized by the availability simulation engine 112.

The model parameters component 114 is a database that stores simulation model parameters relating to duration and number of simulation runs, stopping conditions and refresh frequency of the availability data within the model. A developer at modeler client system 104 may provide specific values for these parameters to the availability simulation engine 112. The model parameters component 114 is created for use by the availability simulation engine 112.

The product information component 116 is a database that stores detailed information about the products in the model including, for example, product name, product number, whether a product is a configured product, and plant of manufacture. In exemplary embodiments, the availability simulation engine 112 accesses the product information component during the simulation process described herein. The product information component 116 may be a legacy database of the enterprise executing the availability simulation engine 112.

The bill of material component 118 is a database that stores the structure of the products being sold including, for example, the number of high level components that the products contain. These components are used in the availability simulation of the higher-level product. In exemplary embodiments, the availability simulation engine 112 accesses the bill of material component 118 during the simulation process described herein. The bill of material component 118 may be a legacy database of the enterprise executing the availability simulation engine 112.

The supply information component 120 is a database that stores the anticipated availability of supply for components and end products in time buckets (e.g., daily or weekly). It may also contain information of variability and uncertainty of the supply. In exemplary embodiments, the availability simulation engine 112 accesses the supply information component 120 during the simulation process described herein. The supply information component 120 may be a legacy database of the enterprise executing the availability simulation engine 112.

The sales information component 122 is a database that stores information relating to the sales of each product during the day. It defines sales quantity and a time-dependent distribution of the sales activity, as well as a distribution of components used in configuring products. In exemplary embodiments, the availability simulation engine 112 accesses the sales information component 122 during the simulation process described herein. The sales information component 122 may be a legacy database of the enterprise executing the availability simulation engine 112.

The shipment information component 124 is a database that stores data relating to products that are shipped and removed from the backlog. It may also contain parameters such as the lead time required to manufacture the product. In exemplary embodiments, the availability simulation engine 112 accesses the shipment information component 124 during the simulation process described herein. The shipment information component 124 may be a legacy database of the enterprise executing the availability simulation engine 112.

The forecast information component 126 is a database that stores information about future sales of each product that is used to model future orders. In exemplary embodiments, the forecast information component 126 accesses the bill of material component 118 during the simulation process described herein. The forecast information component 126 may be a legacy database of the enterprise executing the availability simulation engine 112.

The cost and revenue information component 128 is a database that provides information about the amount of profit each product will make when it is sold. This profit information may be used to calculate the expected losses of current and future business due to customer dissatisfaction resulting from inaccurate availability lead times. In exemplary embodiments, the availability simulation engine 112 accesses the cost and revenue information component 128 during the simulation process described herein. The cost and revenue information component 128 may be a legacy database of the enterprise executing the availability simulation engine 112.

The customer satisfaction information component 130 is a database that stores information concerning customer tolerances for incorrect availability dates. It may also contain a threshold parameter concerning the extent to which an availability error is allowed before a customer cancels an order or moves on to a competitor. A developer at modeler client system 104 may provide customer satisfaction information to the availability simulation engine 112. The customer satisfaction information component 130 is created for use by the availability simulation engine 112.

As indicated above, the server 102 communicates with client systems 104 and 106. Client systems include a modeler client system 104 and an availability process management client system 106. For purposes of illustration, the client systems 104 and 106 shown and described in the system of FIG. 1 represent computer devices, such as general-purpose computer devices that allow systems to connect to the network 108 and to server 102. However, it will be understood that client systems 104 and 106 may include other types of communications devices, such as telephones, cell phones, laptops, personal digital assistants, etc.

Figure 2:
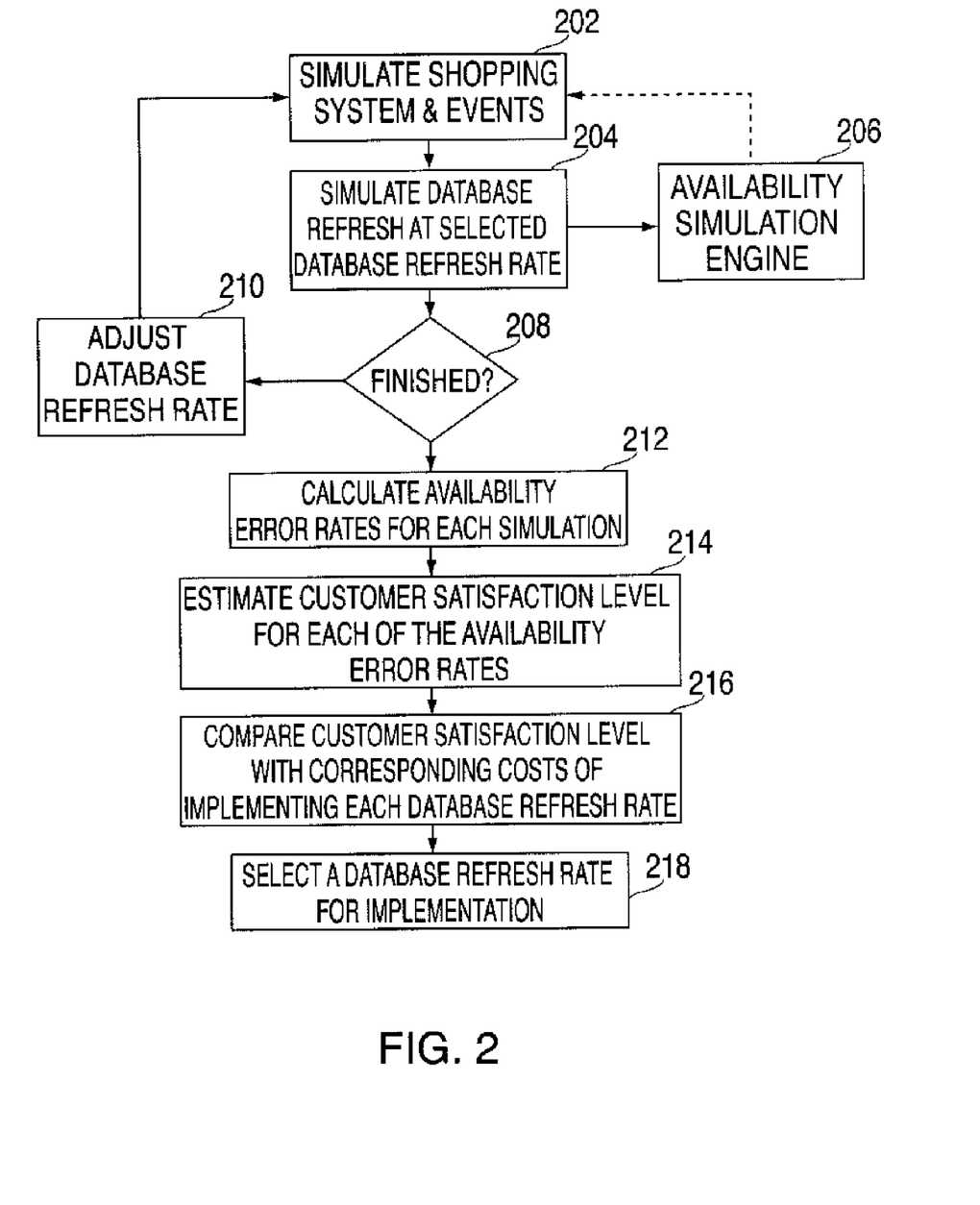
FIG. 2 is a flow diagram describing a process for implementing the refresh optimization services in exemplary embodiments.

Turning now to FIG. 2, a process for implementing the refresh optimization services will now be described in accordance with exemplary embodiments. A simulation model is designed and executed via the simulation engine 112 for simulating a shopping system for an enterprise engaging in electronic commerce at step 202.

At step 204, the simulation engine 112 performs database refreshes at a selected refresh rate. The databases refreshed may include one or more of components 114-130. At step 206, the simulation performed in steps 202 and 204 is verified for accuracy in order to assess whether the results coincide with actual data that would be produced in a real e-commerce environment. If needed, the simulation model may be refined and re-executed whereby the process returns to step 202. Otherwise, it is determined whether there exist additional database refresh rates for simulation at step 208. For example, a modeler or developer at client system 104 will likely want to test a number of database refresh rates in the simulation model for comparative analysis as will be described further herein. If there are additional database refresh rates to be tested at step 208, the current refresh rate is adjusted at step 210 and the process returns to step 202 for additional simulations. Steps 202-210 may be repeated for each database refresh rate to be tested.

If there are no additional refresh rates to be tested at step 208, the simulation engine 112 calculates the availability error rates for each simulation performed above at step 212. At step 214, a customer satisfaction level is estimated for each of the error rates calculated in step 212. A customer satisfaction level refers to the degree to which customers are satisfied with the shopping experience in terms of receiving accurate availability information. The customer satisfaction level may be determined using a number of techniques. For example, business analysts may consult the customer service department of an enterprise, review current service level agreements for customers, and compare the customer service level of other competitor companies.

Figure 4:
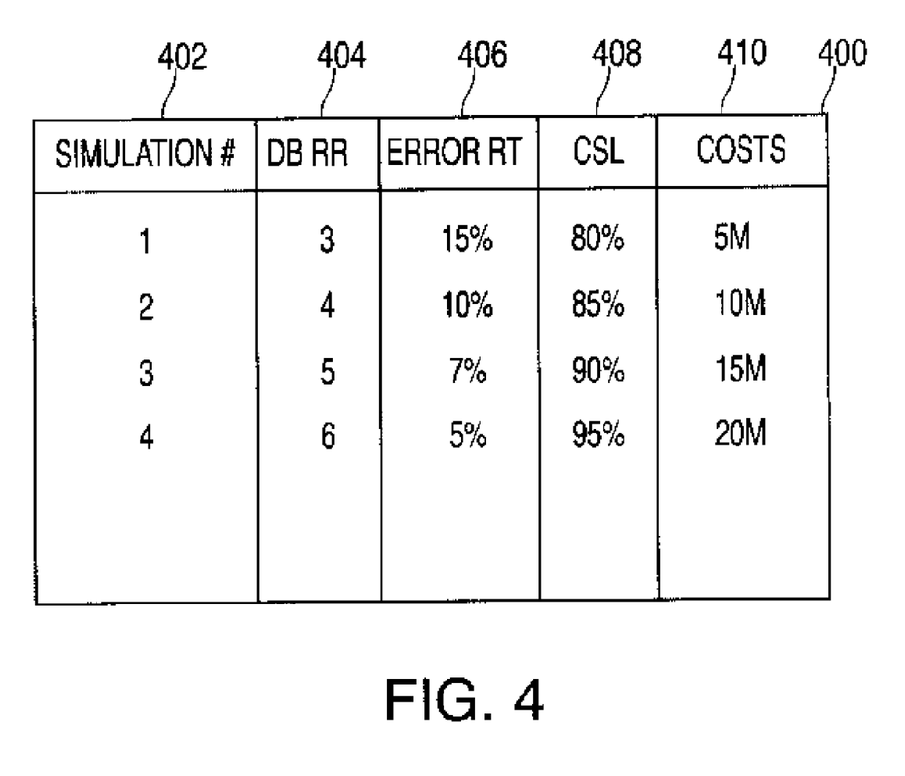
FIG. 4 is a report with sample data produced by the system implementing the refresh optimization services in exemplary embodiments.

A report is generated by the simulation engine 112 and provided to the availability process management client system 106 for analysis. A sample report is shown in FIG. 4. The report 400 of FIG. 4 illustrates results of four simulation runs as indicated in column 402. A refresh rate column 404 indicates the number of database refreshes performed for a given time period (e.g., daily). Error rate column 406 specifies a percentage of error reported to occur for the corresponding refresh rate. Column 408 indicates a percentage of customer satisfaction resulting from the simulation. Column 410 indicates corresponding IT costs involved in implementing the database refreshes at the corresponding rate.

At step 216, the customer satisfaction levels are compared with corresponding costs of implementing each database refresh rate. The costs of implementing each database refresh rate may be determined via the availability simulation engine 112 as described further in FIG. 3. An optimal database refresh rate is determined from the analysis and is selected for implementation at step 218.

Figure 3:
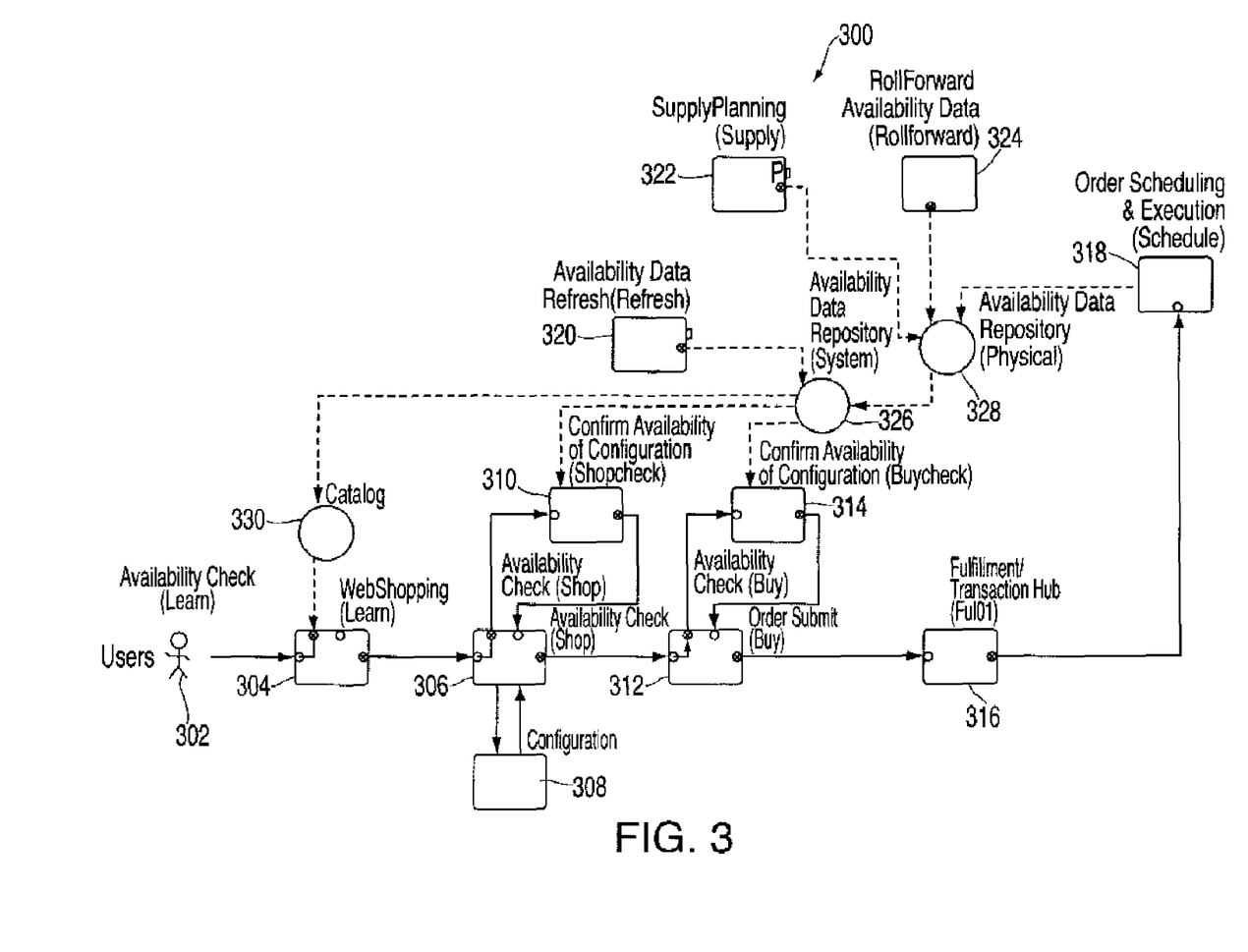
FIG. 3 is a simulation engine utilized in implementing the refresh optimization services in exemplary embodiments.

Turning now to FIG. 3, a diagram describing the simulation engine 112 that estimates the ship date error (i.e., error rates) and an aspect of corresponding information technology (IT) costs will now be described in exemplary embodiments. Rectangular-shaped items in the availability simulation engine 112 of FIG. 3 reflect tasks or actions, and circular-shaped items represent data sources. Data sources 326-330 represent simulated databases. These databases 326-330 may store actual data extracted from one or more of components 116-128 of FIG. 1. The simulation engine 112 starts with modeling customer arrival pattern to the on-line shopping (e-commerce business) web site (302-304). Here, a statistical distribution that describes the customer arrival may be specified. For example, an exponential distribution (a Poisson Process) may be used to describe the customer arrival rate.

The next step is modeling the catalog browsing experience of the customer relating to a product of interest 330. At this step, general availability of product, features and price are displayed for the customer via the catalog. The customer may then proceed to the next step 306 for configuring a specific product by choosing various optional components 308 and requesting ship date information of the product. The ship date request is processed in the availability check process step 310, which accesses the IT system that contains availability outlook data 326.

If the customer is satisfied with the ship date, the customer proceeds to next step, and places an order 312. At this time, the ship date is calculated again using the availability outlook data 326. The availability of product and components are not reserved for this order until the order is actually processed later in the process (318).

The submitted order goes through a fulfillment process 316 and order scheduling process 318, where the availability of the product and components are reserved for this particular order so that other future customer orders cannot use this availability. The products and components are available with respect to time (e.g., daily or weekly time buckets, etc.) and geographic location of the availability. Therefore, the simulation engine 112 uses various scheduling policies to decide from which time-bucket availability it is going reserve product and components for each order. The availability reservation policies may depend on the types of customers and geographic locations where the orders are placed.

The availability outlook database 326 that is used in calculating the ship date is not real time (dynamic) data 328 but a snap shot (static) of real time availability database 328 taken based on the database refresh frequencies. Based on the frequency of the availability database refresh under evaluation, the database refresh event 320 copies the real time availability 328 into the static availability data 326.

The real time availability database 328 changes when a new supply of components arrives as a result of supply planning. The arrival of new supply 322 depends on the supply replenishment frequencies, which can be a periodic event (e.g., daily or weekly). The supply arrival event is modeled using a distribution function in the simulation model. The quantities of new supply is also modeled using a distribution function, which is derived based on the historic pattern or newly anticipated pattern, and variability of supplier commitment. The real time availability is rolled forward at the end of the time period 324, from a time bucket to an earlier time bucket, etc. The real time availability is also updated 318 when an order is scheduled and a certain availability quantity is reserved for the order.

The tasks specified as rectangles in FIG. 3 are determined to have certain processing time, which is modeled with various distribution functions, such as normal, lognormal and exponential distributions. The tasks require certain resources such as IT servers in order to be executed. As each resource is used for a certain task, the corresponding costs are automatically calculated in the simulation model. For the availability data refresh task 320, for example, a certain number computer servers are used, and the resulting costs are estimated.

As indicated above, the refresh optimization services enable a business enterprise to determine an effective database refresh frequency of availability outlook by simulating the corresponding supply chain. Using the simulation results, business decision makers may compare the customer service level, as well as the cost of future lost opportunities to corresponding IT expense for several feasible refresh frequency ranges, and make an educated decision on the database refresh frequency of supply chain availability outlook.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

What is claimed is:

1. A method for determining an optimal availability outlook database refresh rate, comprising:
    simulating a shopping system that includes at least one simulated availability outlook database, the simulating including updating the at least one simulated database in accordance with a database refresh rate;
    repeating the simulating for each of a number of database refresh rates;
    calculating error rates for availability of products resulting from each of the simulations;
    estimating customer satisfaction levels for the error rates; and
    determining the optimal database refresh rate by comparing the customer satisfaction levels to corresponding costs of implementing database refreshes for each of the database refresh rates.

2. The method of claim 1, further comprising selecting one of the database refresh rates for implementing based upon the comparing.

3. The method of claim 1, wherein the simulating further includes:
    modeling website events including customer arrival patterns, catalog browsing, product queries, and product orders; and
    determining availability of products subject to the events by searching the at least one simulated database.

4. The method of claim 3, wherein the modeling further comprises:
    modeling a processing time for performing the events;
    identifying resources required to perform the events; and
    for each of the resources used in performing the events, calculating corresponding costs of using the resources factoring in the processing time.

5. The method of claim 4, wherein the corresponding costs of implementing database refreshes is derived from the calculating corresponding costs of using the resources.

6. The method of claim 1, wherein the at least one simulated database stores actual product availability information from enterprise databases, the databases including at least one of a:
    product information database;
    bill of material database;
    supply information database;
    sales information database;
    shipment information database;
    forecast information database; and
    cost and revenue information database.

7. The method of claim 1, wherein the estimating customer satisfaction levels includes determining customer tolerances for incorrect availability information.

8. A system for determining an optimal availability outlook database refresh rate, comprising:
    a processor;
    a storage device in communication with the processor; and
    an availability simulation engine executing on the processor, the availability simulation engine performing:
    simulating a shopping system that includes at least one simulated availability outlook database, the simulating including updating the at least one simulated database in accordance with a database refresh rate;
    repeating the simulating for each of a number of database refresh rates;
    calculating error rates for availability of products resulting from each of the simulations;
    estimating customer satisfaction levels for the error rates; and
    determining the optimal database refresh rate by comparing the customer satisfaction levels to corresponding costs of implementing database refreshes for each of the database refresh rates.

9. The system of claim 8, wherein the availability simulation engine further performs:
    selecting one of the database refresh rates for implementing based upon the comparing.

10. The system of claim 8, wherein the simulating further includes:
    modeling website events including customer arrival patterns, catalog browsing, product queries, and product orders; and
    determining availability of products subject to the events by searching the at least one simulated database.

11. The system of claim 10, wherein the modeling further comprises:
    modeling a processing time for performing the events;
    identifying resources required to perform the events; and
    for each of the resources used in performing the events, calculating corresponding costs of using the resources factoring in the processing time.

12. The system of claim 11, wherein the corresponding costs of implementing database refreshes is derived from the calculating corresponding costs of using the resources.

13. The system of claim 8, wherein the at least one simulated database stores actual product availability information from enterprise databases, the databases including at least one of a:
    product information database;
    bill of material database;
    supply information database;
    sales information database;
    shipment information database;
    forecast information database; and
    cost and revenue information database.

14. The system of claim 8, wherein the estimating customer satisfaction levels includes determining customer tolerances for incorrect availability information.

15. A computer program product comprising a storage medium readable by a processing circuit and storing instructions for execution by the processing circuit for facilitating a method for determining an optimal availability outlook database refresh rate, the method comprising:
    simulating a shopping system that includes at least one simulated database, the simulating including updating the at least one simulated availability outlook database in accordance with a database refresh rate;

repeating the simulating for each of a number of database refresh rates;

calculating error rates for availability of products resulting from each of the simulations;

estimating customer satisfaction levels for the error rates; and determining the optimal database refresh rate by comparing the customer satisfaction levels to corresponding costs of implementing database refreshes for each of the database refresh rates.

16. The computer program product of claim 15, further comprising instructions for selecting one of the database refresh rates for implementing based upon the comparing.

17. The computer program product of claim 15, wherein the simulating further includes:

modeling website events including customer arrival patterns, catalog browsing, product queries, and product orders; and determining availability of products subject to the events by searching the at least one simulated database.

18. The computer program product of claim 17, wherein the modeling further comprises:

modeling a processing time for performing the events;

identifying resources required to perform the events; and for each of the resources used in performing the events, calculating corresponding costs of using the resources factoring in the processing time.

19. The computer program product of claim 18, wherein the corresponding costs of implementing database refreshes is derived from the calculating corresponding costs of using the resources.

20. The computer program product of claim 15, wherein the at least one simulated database stores actual product availability information from enterprise databases, the databases including at least one of a:

product information database;

bill of material database;

supply information database;

sales information database;

shipment information database;

forecast information database; and cost and revenue information database.

21. The method of claim 1, wherein the simulating further includes:

calculating the expected losses of current and future customer losses due to customer dissatisfaction from profit information.

22. The system of claim 8, wherein the availability simulation engine further performs:

calculating the expected losses of current and future customer losses due to customer dissatisfaction from profit information.

23. The computer program product of claim 15, wherein the simulating further includes:

calculating the expected losses of current and future customer losses due to customer dissatisfaction from profit information.

* * * * *